Aug. 8, 1944. F. RENNER 2,355,559
COVER FOR CONTAINERS
Filed Nov. 6, 1940
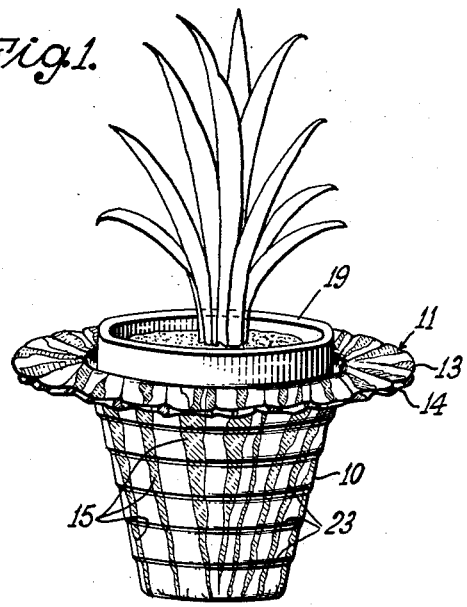
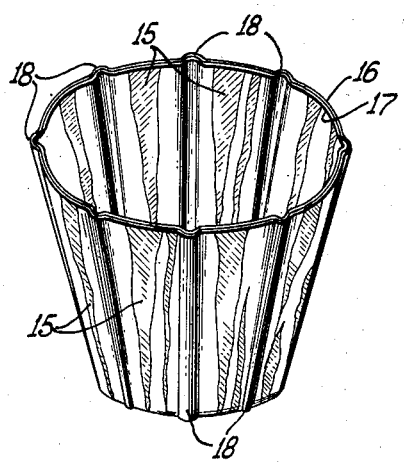
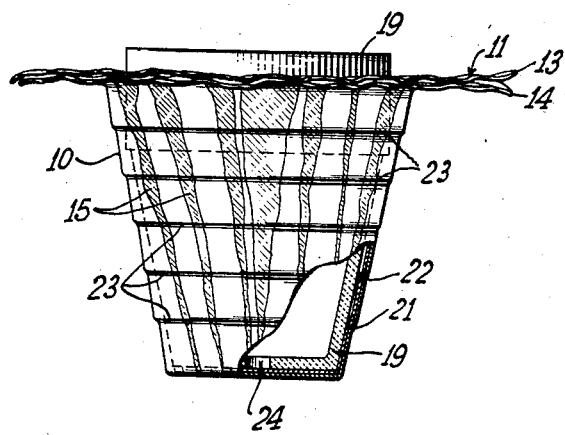
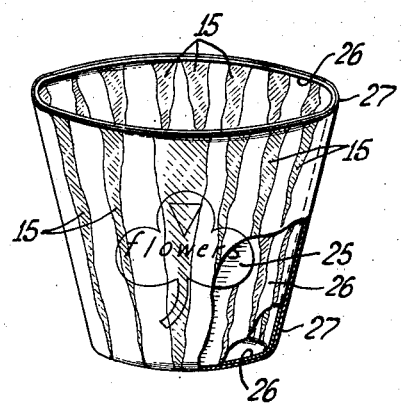
INVENTOR
FRANK RENNER
BY
Worth Wade
ATTORNEY Patented Aug. 8, 1944

2,355,559

UNITED STATES PATENT OFFICE 2,355,559

COVER FOR CONTAINERS

Frank Renner, Chicago, Ill., assignor to Renner & Company, Chicago, Ill., a corporation of Illinois Application November 6, 1940, Serial No. 364,488

5 Claims. (Cl. 229—8)

This invention relates to a decorative article and in particular to a decorative covering for containers and the like and to a process for making the same. The invention also includes correlated improvements designed to enhance the structure, appearance and utility of such articles.

It is often desired to provide a decorative cover for pots containing growing plants in order to conceal the pottery and to impart color thereto.

It is a general object of the present invention to provide a fitted covering for flower pots and other containers, formed of light-reflecting material which will add to the beauty and reflect the colors of a floral display.

It is a further object of the present invention to provide a re-usable jacket for containers formed of non-fibrous, light-reflecting material which is susbtantially moistureproof and waterproof.

It is a specific object of the present invention to provide a molded covering for containers which will be self-sustaining and capable of use on containers of different sizes.

Other objects of the present invention will in part be obvious and will in part appear hereinafter.

According to the present invention there is provided as a decorative cover for containers formed of a continuous sheet of non-fibrous, light-reflecting flexible material, said article having a closed bottom integral with plicated side walls, the plicated side walls contributing to the strength, rigidity and beauty of the decorative covering device.

In the preferred embodiment of the invention there is provided a molded cover for containers said covering being formed of a plurality of flat sheets of heat-sealable regenerated cellulose having moistureproof and/or waterproof characteristics, the side walls of said body being plicated and the top portion adjacent the mouth being bent away from the side walls to form a flared ruffled collar.

The invention accordingly comprises the several steps and relation of one or more of such steps with respect to each of the others, and the article possessing the features, properties, and the relation of elements, which are exemplified in the following detailed disclosure, and the scope of the invention will be indicated in the claims.

For a fuller understanding of the nature and objects of the invention reference should be had to the following detailed description taken in connection with the accompanying drawing, in which:

Fig. 1 is a perspective view of one embodiment of the article of the invention shown in combination with a potted plant;

Fig. 2 is a detailed perspective view of a further embodiment of the article of the invention;

Fig. 3 is a detailed perspective view of another embodiment of the invention having a portion thereof broken away; and Fig. 4 is a further embodiment of the present invention bearing indicia and having a portion thereof cut away to show detail.

The article of the invention may be constructel of a plurality of non-fibrous sheets of light-reflecting material having heat-sealable characteristics nd which may be formed by molding into a predetermined shape by means of heat and pressure, causing the overlapping areas of the sheets to become welded together to assume the desired shape. The protruding corners and edges of the body thus formed may be separated or trimmed away to form a skirt and the skirt then bent away from the side walls of the body at approximately right angles thereto, so as to form a ruffled collar. The article is conveniently formed by inserting a plurality of sheets of flexible heat-sealable material of the class described between a pair of co-acting heated dies of suitable shape, size and design, which are pressed together to form the article.

Material which may be used to form the article of the invention comprises flexible heat-sealable sheets of non-fibrous, glossy, light-reflecting material. Such non-fibrous material may be metallic or non-metallic, transparent or opaque and preferably having moistureproof and/or waterproof characteristics. The material may be colorless, colored, opaque or otherwise decorated before, during or after manufacture by the addition of coloring matter or by adding effect materials.

Non-metallic materials which may be used comprise inherently heat-sealable sheets, pellicles and films formed of cellulose ethers, cellulose esters, synthetic resins, halogenated rubber and the like, or of materials such as regenerated cellulose, gelatin, casein, and the like. These materials which are not heat-sealable per se but may be rendered heat-sealable by being coated with a heat-sealable composition comprising such materials as cellulose esters, cellulose ethers, synthetic resins, rubber and mixtures of these materials. Furthermore, such of those materials which are not moistureproof in themselves may be treated with suitable compositions to render them both heat-sealable and moistureproof in manner known to the art, for example with the composition disclosed in U. S. Patent 1,989,683 issued February 5, 1935, to Ralph T. K. Cornwell.

Various metallic substances which may be employed comprise pellicles, foils and films of such metallic substances as aluminum, tin and lead and alloys thereof. Such materials may be treated to render them heat-sealable and used alone, or they may be used in combination with films formed of non-metallic materials having heat-sealable characteristics in order to form the article of the invention or with fibrous materials such as cloth, paper, glassine, and the like, or such combinations thereof. Likewise films of organic plastic materials may be coated or laminated with metallic films. When such fibrous materials are used in combination with non-fibrous materials it is preferred that at least one of such sheets of non-fibrous material is employed to form the outermost layer of the article, so that full advantage is taken of its light-reflecting properties.

In the formation of the article of the invention, there is preferably employed a plurality of sheets of material of the class described having heat-sealing characteristics and capable of being pressed into a shape having a form-fitting relationship to the base of a flower pot or similar container. The article may be formed into a desired shape by the use of heated dies, whereupon the sheets are pressed into overlapping folds and become heat-sealed between the folds as well as between themselves to form the body of desired shape.

Referring to Fig. 1 of the drawing, there is shown one embodiment of the article of the invention which may be used as a covering for a flower pot. The article 10 is formed of a plurality of individual sheets of a light-reflecting, glossy material, heat-sealed and molded into a shape which tightly fits the pot containing the flowers, one of the sheets, preferably the inner sheet, being colored. The skirt 11 of the container or cover may be trimmed of protruding edges and corners and shaped to form a ruffled collar. The individual sheets 13 and 14 forming the side walls of the article are heat-sealed together, and the plicated portions 15 formed during the shaping operation are also heat-sealed together thus giving additional strength and rigidity to the article.

In Fig. 2 there is illustrated a further embodiment of the invention comprising a plurality of individual sheets 16 and 17 formed of transparent, light-reflecting, heat-sealable material, at least one of the sheets being opaque and/or colored and formed into the article of the invention, and having vertical corrugations 18 formed in the side walls thereof. The corrugations which are formed during the shaping operation are capable of slight expansion due to the flexibility of the material used, and so permit the article to firmly grip the container. The individual sheets of material are heat-sealed over the contacting areas forming plicated side walls comprising striations and overlapping folds 15 which are heat-sealed together, and in turn sealed to the individual sheets. This article is most conveniently employed as a covering device for a potted plant, casserole, vase, or similar container.

In Fig. 3 there is shown in elevation the article illustrated of Fig. 1 but having one portion of the side wall broken away to show detail. The arcuate ridges 23 which are formed in the side walls add a certain amount of lateral rigidity to the walls while at the same time they provide a slight degree of elastic extensibility in the article in a direction coinciding with that of the vertical axis. This elastic extensibility provides for a greater frictional resistance between the covering device 10 and the container 19, as at the points of contact 21 and 22 when the device is fitted over the container, and permits the cover to be used with vessels of different sizes. The article of the invention is preferably formed of moistureproof and/or waterproof material in order to prevent moisture, dirt and other objectionable material from seeping through drainage hole 24 and staining the table.

In Fig. 4 there is illustrated in perspective a further embodiment of the article of the invention having indicia 25 positioned between the sheets 26 and 27. A portion of the covering device is broken away to show more clearly the construction of this embodiment. In forming the article a slip sheet bearing a trade-mark or indicia 25, such as a clover leaf or other printed matter, is placed between transparent sheet materials of the class described before pressing the article into the desired shape. After formation of the article into the structure illustrated the side walls are plicated in overlapping folds 15 and the slip sheet 25 bearing the indicia is protected against obliteration and removal, but on the other hand is readily observed by being viewed through the transparent sheet material.

In forming the article of the invention it is preferred to employ at least one transparent sheet material which is colored or tinted. When colored sheets are heat-sealed into desired shape, the color is intensified in the overlapping portions, as in overlapping folds 15, and the variations in shade thus produced add to the decorative character of the structure. The article has surprising rigidity due to the formation of the folds in the plicated walls.

In the preferred embodiment the article is formed of a plurality of sheets of regenerated cellulose coated with a heat-sealing composition as shown in U. S. Patent No. 1,989,683. These sheets are pressed into the desired shape under heat and pressure. Alternatively, there may be used a single sheet of transparent heat-sealable regenerated cellulose in combination with another sheet or sheets of different material, such as a sheet of aluminum foil, and the combined sheets then placed together and die-pressed into the desired shape. By the combination of such dissimilar materials unusual properties, such as enhanced light-reflecting properties, rigidity, and strength are realized. A single sheet of material of the class described may be used to form the article of the invention, but is is preferred that a plurality of sheets be used since the several sheets tend to reinforce each other as well as themselves, when heat-sealed in overlapping folds.

The shape of the article may be considerably varied to conform to the base of a container for which it is to be adapted. The article may be pressed between dies to form articles having ridges in the side walls, striations, bottoms which are rounded or flat, and such variations of structure fall within the scope of the present invention.

The sheets which may be used to form the article may bear indicia or other printed matter, printed plain or printed in reverse. Alternatively, slip sheets bearing advertising or other printed matter may be inserted between the several sheets of material forming the article and then heat-sealed therebetween. Thus printed matter and advertising data may be readily observed between the several sheets of the formed article, but by being maintained between the several sheets there is provided additional insurance against removal and defacement.

Among the advantages there is provided an article which may be employed as a covering for flower pots, vases, bowls, casseroles or other containers and which is substantially moistureproof and/or waterproof and which prevents moisture, dirt or other matter from soiling the table or furniture on which the container rests. The use of heat-sealable materials in forming the article has the additional advantages not only of providing a tight seal but also by being completely transparent permits the unimpeded transmission of reflected light. Furthermore, such heat-sealing compositions are of a nature which usually enhance the moistureproof and/or waterproof characteristics of the article.

Various decorative effects may be achieved in forming the cover, as by choosing sheets having differing light-reflecting properties or varieties of colors to create unusual visual effects. In forming the article the plicated folds in the side walls overlap in a manner which not only provides additional strength to the article, but when colored or tinted materials are used to form the covering such colors overlap to provide deeper colors in the overlapped portions which contrast with the lighter shades in the portions not overlapping and thus provide a covering device which is unusually attractive and appealing to the eye.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. As a new article of manufacture, a presentation novelty comprising a plurality of superimposed, transparent sheets formed with an embossed or dished partially rigid central portion, and a wavy, frilly portion surrounding said central portion, said sheets being fused together peripherally around said dished portion.

2. As a new article of manufacture, a presentation novelty comprising a plurality of superimposed, transparent sheets formed with an embossed or dished partially rigid central portion, said sheets being fused together peripherally around said dished portion, and extending as a wavy, frilly portion surrounding the fused portion, said central portion having gathers and creases to simulate veins.

3. As a new article of manufacture, an ornamental container comprising a plurality of superimposed transparent sheets in intimate surface contact in an intermediate zone and constituting a partially rigid central portion, said sheets being united around a peripheral margin of said zone, the sheets beyond said margin being free of each other to assume a wavy and frilly condition.

4. As a new article of manufacture, a container cover comprising a plurality of superimposed, transparent sheets formed with an embossed or dished partially rigid central portion, and a wavy, frilly portion surrounding said central portion, said sheets being fused together peripherally around said dished portion.

5. As a new article of manufacture, a cover for a container comprising a plurality of superimposed, transparent sheets formed with an embossed or dished partially rigid central portion, said sheets being fused together peripherally around said dished portion, and extending as a wavy, frilly portion surrounding the fused portion, said central portion having gathers and creases to simulate veins.

FRANK RENNER.